Nov. 20, 1928.

J. DE LA CIERVA 1,692,082

AIRCRAFT WITH ROTATIVE WINGS

Filed Nov. 10, 1926

Inventor.
J. de la Cierva
by Fetus Linbaugh & Co
Attys.

Nov. 20, 1928. 1,692,082
J. DE LA CIERVA
AIRCRAFT WITH ROTATIVE WINGS
Filed Nov. 10, 1926 2 Sheets-Sheet 2
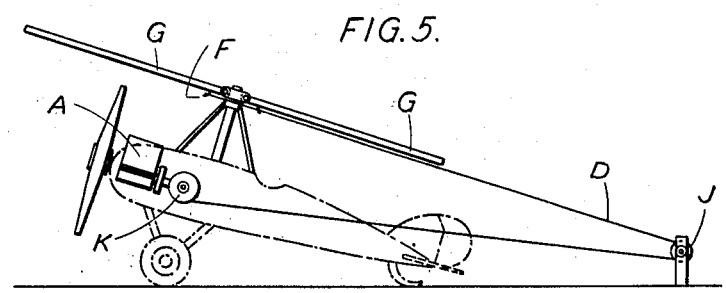
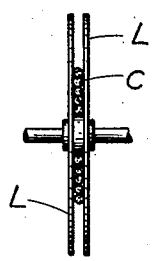
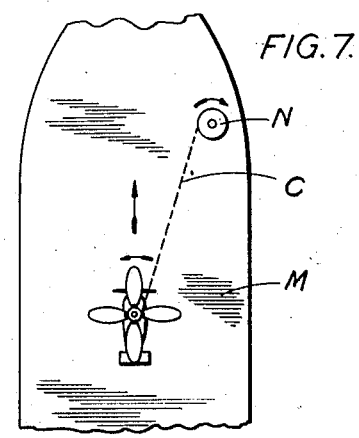
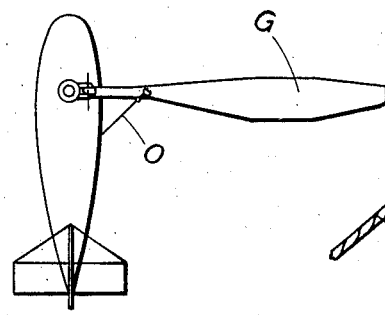
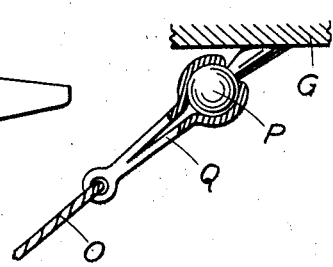
Inventor.
J. de la Cierva Patented Nov. 20, 1928.

1,692,082

UNITED STATES PATENT OFFICE.

JUAN DE LA CIERVA, OF MADRID, SPAIN.

AIRCRAFT WITH ROTATIVE WINGS.

Application filed November 10, 1926, Serial No. 147,571, and in Great Britain November 24, 1925.

This invention relates to aircraft of the type embodying a wing system which rotates freely in flight by reason of the action of the air flow on the wings and in which the wings are hinge-jointed to a member constituting their common centre of rotation in such a manner that each wing is free to adopt at all times positions in which the centrifugal force due to rotation and the lift are in equilibrium.

Now in aircraft of this type it is preferable to set the wing system rotating before the aircraft commences its advance prior to taking off since in this manner the preliminary run may be greatly reduced.

A method hitherto employed to impart this initial rotation as to wind a flexible cable around a series of blocks or hooks secured one to each wing at some distance from the axis of rotation and then to have said cable manually pulled by a number of men.

It is obviously desirable that an aircraft of this type should embody some intrinsic means of imparting this initial rotation to the wing system and the present invention broadly consists in obtaining this result by mechanical means.

Where the source of power of this purpose is located in or forms part of the aircraft, as for example the prime mover driving the air screw or one of them, the connection to the rotating wing system may comprise either suitable shafting and gearing or a flexible element such as a cable.

Where the system of flexible cable applied direct to the wings is employed a suitable arrangement comprises a drum or spool mounted on or connected to the prime mover shaft through a clutch or equivalent, preferably such as to allow some slip in taking up the torque, and one or more pulleys suitably disposed in or on the body of the aircraft in such a manner as to lead the flexible cable to blocks or hooks secured to the wings. Since the outline in plan of the cable wound around the blocks is not a circle but a polygon the number of whose sides corresponds to the number of wings, a yielding or resilient element should be included at some convenient point in the system. One or more of the pulleys may for example be yieldingly mounted on springs.

It is an advantage to have the velocity of the pull increase progressively and for this purpose the driven drum or pulley may be conoidal in form, or alternatively same may be of small diameter and relatively narrow in section with broad end plates so that the turns of the cable shall wind up one over another.

If desired one of the intermediate pulleys may be entirely external to the aircraft, for instance same may be mounted in the ground of the aerodrome or on the deck of a ship.

There are various modifications of this system in accordance with the present invention operating to enable the aircraft to take off much more quickly, which is of especial advantage in the launching of aircraft from ships. Where one of the intermediate pulleys is external to the aircraft it may be disposed in front of the position taken up by the aircraft when preparing for flight, and the progressive pull on the cable may be such that the applied forces have a resultant in the forward direction, which can be so calculated that, combined with the pull of the air screw the machine is projected forward simultaneously with the rotation of the wing system.

In another modification the external pulley is located behind the aircraft in its position preparatory to starting, and the cable is led from the blocks on the wings over this external pulley to the driven drum. The respective dimensions of the latter, the distance of the wing blocks from the axis of rotation and the mechanical and aerodynamical characteristics of the wing system and of the air screw, as well as the power and speed of the engine are calculated in such a manner that the forward pull of the air screw is balanced by the resultant of the forces due to the effort exerted on the wing system. When the engine is started the air craft will not move forward until the cable is unwound from the wings, whereupon it will start automatically at full throttle.

If an initial angular velocity greater than that which is normal in flight be imparted to the wing system, and if the wings be given a positive incidence which may later if desired be regulated in flight, the aircraft may be made to take off still more rapidly.

In all cases where starting is effected by cable, some form of brake or retaining device should be provided to prevent the wings being set in rotation accidentally, for instance by the wind. Any convenient device may be used for this purpose for example an automatically releasing spring clip connecting the wing system to some fixed part of the apparatus, or merely a connecting element breakable at a certain tension.

The accompanying drawings diagrammatically illustrate several forms of apparatus in accordance with the present invention.

Fig. 5 shows a form of starting apparatus in which an external pulley is mounted in rear of the aircraft.

Fig. 6 shows a form of wind-on pulley which may be used as an alternative to that shown in Fig. 4.

Fig. 7 represents diagrammatically a form of starting apparatus especially suitable for launching aircraft of this type from ships.

Figs. 8 and 9 illustrate one example of releasable retaining gear to prevent accidental rotation of the wing system.

Figure 1:
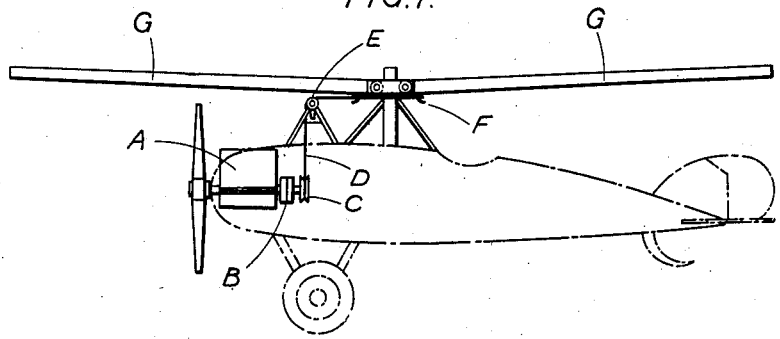
Fig. 1 is a side elevational view of an aircraft embodying a rotative hinged wing system of the type referred to with one form of cable connection enabling the wing system to be set rotating by the prime mover.
Figure 2:
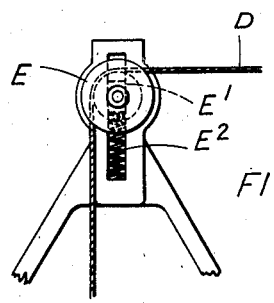
Fig. 2 is a local view to an enlarged scale of a yieldingly mounted intermediate pulley.

Referring more particularly to Figs. 1 and 2:—

The prime mover A of the aircraft such as the usual internal combustion engine is connected through a clutch B provided with any suitable hand control to a pulley C to which is secured one end of a flexible cable D passing over an intermediate pulley E and wound around blocks or the like F secured to the underside of each wing G, the latter being hingedly secured to a suitable rotative member in the manner described in my United States patent specification No. 1,590,497.

A reduction gear of any convenient type may be included in the transmission from the engine if desired.

As shown in Fig. 2 the intermediate pulley E is mounted in bearings $E^1$ yieldingly supported in guides by a spring $E^2$, this arrangement being provided in cases where ordinary blocks or hooks such as F are used on the wings since the figure formed by the cable when wound on the blocks is a polygon with sides equal to the number of said blocks and the pull in consequence is irregular.

Figure 3:
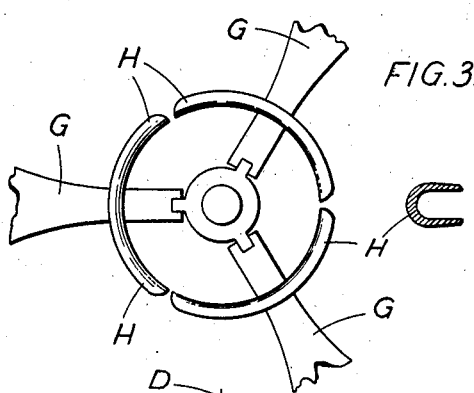
Fig. 3 is a view in plan of the inner part of a rotating wing system illustrating a preferred form of the guides for a flexible starting cable.

There is shown in Fig. 3 however a form of guide H for receiving the flexible cable in which this objection is eliminated.

These guides are arcuate in plan and suitably channel-shaped in section, and together constitute a circular element around which the cable is wound.

It will be obvious that there must be a separate guide secured to each wing since the wings have a variable beating movement due to the action of the air in flight.

Figure 4:
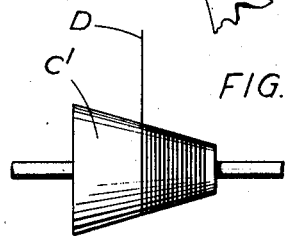
Fig. 4 shows a conical wind-on pulley or drum for the cable.

Fig. 4 shows a driven wind-on pulley $C^1$ in the form of a truncated cone which may usefully be employed for the purpose of progressively increasing the speed of the wing system, the cable D being wound from the smaller end of the cone which may be made to traverse slowly in a lengthwise direction in any convenient manner as for instance by a worm or similar gear.

In the form illustrated in Fig. 5 an external pulley J is mounted behind the aircraft in its position preparatory to starting and the cable D is led from the blocks F (or guides H) on the wings around this pulley J to a driven drum or spool K mounted on the side of the fuselage and driven from the engine through a clutch and reducing gear, etc., as may be desired.

In this form the various forces acting on the aircraft are calculated so that the forward pull of the air screw is balanced by the pull on the cable. Under these conditions the aircraft will not move forward until the cable is unwound from the wings and the latter are rotating at their desired speed whereupon the aircraft will start automatically at full throttle.

Fig. 6 shows a suitable form of wind-on pulley with broad end plates L such that the turns of the cable C will wind up one over another and progressively increase the speed of the wing system.

In Fig. 7 an aircraft is shown preparatory to being launched from the deck M of a ship. In this case an external pulley N driven by an outside source of power is located in front of the position taken up by the aircraft when preparing for flight and the progressive pull on the cable C may be such that the applied forces have a resultant in the forward direction, which can be so regulated that combined with the pull of the air screw, the machine is projected forward simultaneously with the rotation of the wing system.

In Figs. 8 and 9 one of the wings G is connected to the body of the aircraft by a stay O, and a ball P held in a friction clip Q such that release is automatically effected when a predetermined pull is applied. Such an arrangement prevents the wing system being set in rotation accidentally as by a sudden gust of wind when the aircraft is at rest on the ground.

As an alternative to the ball and spring clip or other equivalent retaining means, a portion of the stay O may be made breakable at a predetermined tension.

Other forms of starting gear in accordance with the present invention include mechanical starters mounted on land vehicles (or on tenders, for seaplanes) acting somewhat after the manner of the mechanical starters at present in use for air screws. Such starters may include suitable shafting with flexible or universal joints and a convenient engaging gear for connection to the shaft or to the supporting member of the rotating wing system.

Another arrangement comprises a suitable prime mover, for instance an electric motor located in a cavity in the surface of the aerodrome or the deck of a ship said prime mover having a more or less vertical shaft provided with suitable engaging means for connection to a rotative shaft supporting the wings said shaft being prolonged downwardly to the underside of the fuselage, and the aircraft preparatory to flight being located over said cavity.

In another instance, one of the driving wheels of a motor road vehicle may be provided with a drum to take the flexible cable connection to the wings, this said wheel being jacked up clear of the ground and driven through the differential gear, the other wheel being held stationary.

What I claim is:—

1. In aircraft, the combination with a plurality of freely rotative supporting wings hinge-jointed to the axis of rotation, of a power transmission device temporarily connecting the wings to the prime mover of the air craft to set said wings initially rotating, said device thereupon becoming automatically inoperative.

2. In air craft, a plurality of freely rotative supporting wings hinge-jointed to the axis of rotation, members mounted on said wings and adapted to have a flexible cable wound thereon, a drum operatively connected to the prime mover of the aircraft, and a cable connecting said drum with the cable-supporting members on the wings whereby a torque is temporarily transmitted from the prime mover to the wings to set them initially rotating.

3. In air craft, a plurality of freely rotative supporting wings hinge-jointed to the axis of rotation, members secured to the wings and adapted to have a cable wound thereon, a drum operatively connected to the prime mover of the aircraft, a cable attached to said drum and adapted to be wound around the members secured to the wings, and an intermediate pulley over which the cable is adapted to pass and so disposed that the pull of the cable on the wings acts in a plane substantially parallel to the plane of rotation of the wings.

4. In aircraft, a plurality of freely rotative supporting wings hinge-jointed to the axis of rotation, members secured to the wings and adapted to have a cable wound thereon, a drum operatively connected through a reduction gear to the prime mover of the air craft, a cable attached to said drum and adapted to be wound around the members secured to the wings, and an intermediate pulley over which the cable is adapted to pass and so disposed that the pull of the cable on the wings acts in a plane substantially parallel to the plane of rotation of the wings.

5. In aircraft, a plurality of freely rotative supporting wings hinge-jointed to the axis of rotation, members secured to the wings and adapted to have a cable wound thereon, a drum operatively connected to the prime mover of the aircraft, a manually actuated clutch and a reduction gear forming part of said connection, a cable attached to said drum and adapted to be wound around the members secured to the wings, and an intermediate pulley over which the cable is adapted to pass and so disposed that the pull of the cable on the wings acts in a plane substantially parallel to the plane of rotation of the wings.

6. In air craft, a plurality of freely rotative supporting wings hinge-jointed to the axis of rotation, members secured to the wings and adapted to have a cable wound thereon, a drum operatively connected to the prime mover of the aircraft, a manually actuated clutch and a reduction gear forming part of said connection, a cable attached to said drum and adapted to be wound around the members secured to the wings, a yieldingly mounted pulley disposed intermediate the drum and the members on the wings and disposed in a horizontal plane such that the cable passing over said pulley transmits a pull acting in a plane substantially parallel to the plane of rotation of the wings.

7. In air craft, a plurality of freely rotative supporting wings hinge-jointed to the axis of rotation, arcuate members of substantially channel section secured to said wings so as to form a circular guide for a cable wound thereon, a drum operatively connected to the prime mover of the aircraft, a cable attached to said drum and adapted to be wound around the members secured to the wings, and an intermediate pulley over which the cable is adapted to pass and so disposed that the pull of the cable on the wings acts in a plane substantially parallel to the plane of rotation of the wings.

8. In aircraft having freely rotative supporting wings hinge-jointed to the axis of rotation, mechanism for setting said wings in rotation from rest comprising a drum mounted externally on the body of the aircraft and connected to the prime mover through a slipping clutch, a pulley mounted in the landing surface in rear of the aircraft, members secured to the wings and adapted to have a cable wound thereon, and a cable attached to the said drum and passing over the pulley located in rear of the aircraft and thence wound about the members secured to the wings.

JUAN DE LA CIERVA.